Patented May 9, 1950

2,507,236

UNITED STATES PATENT OFFICE 2,507,236

GERMICIDAL SOLUTION

John S. Williams, Lancaster, Pa.

No Drawing. Application February 13, 1945,
Serial No. 577,726

1 Claim. (Cl. 167—26)

The present invention relates to germicidal solutions, adapted (1) for sterilizing surgical instruments, and (2) for sterilizing the skin of living humans in preoperative surgery. For the composition to be applied to the skin of a living human, the preferred formaldehyde body is paraformaldehyde (polymer of $CH_2O$) and this should be free from methanol and free from formic acid.

For a germicidal composition for sterilizing the skin of living persons, as in preoperative surgery, or for sterilizing surgical instruments, I recommend the following:

| | Parts |
|---|---|
| Sodium hexametaphosphate | 1 |
| Sodium citrate | 7 |
| Sodium carbonate | 10 |
| Sulphonated castor oil | 10 |
| Paraformaldehyde | 10 |

The above components can be dissolved in 62 parts of water.

The pH of this solution is a little over 8. (Tested after standing over three years, it had not changed.)

This solution can be used full strength, or after dilution with water, and the extent of dilution can be varied: even diluted 100:1 (100 parts of water to one part of the solution), it is still an effective germicide for some uses.

In these compositions, the sodium citrate acts to prevent undesirable reactions of the formaldehyde, during storage of the solutions. It acts as an anticoagulant of proteins in blood or serum. The sodium carbonate gives a mildly alkaline condition to the solutions. This is an important factor. The hexametaphosphate helps to stabilize the solutions and prevents cloudiness on diluting the solutions with tap water. The sulphonated castor oil should have all free sulphuric acid carefully neutralized by an alkali. It gives the solutions increased penetrating power.

The proportions given above are wholly satisfactory to give the stated results, and are found, in practice to be the most satisfactory. However, it is possible to vary these proportions and still have fairly satisfactory results.

The entire composition is free from methanol and similar alcohols, and also free from phenolic bodies, which is a great advantage.

I claim:

A germicide suitable for application to the skin of living humans and for sterilizing surgical instruments, which comprises the following:

| | Parts |
|---|---|
| Sodium hexametaphosphate | 1 |
| Sodium citrate | About 7 |
| Sodium carbonate | About 10 |
| Paraformaldehyde | About 10 |
| Sulphonated castor oil, free from sulphuric acid | About 10 | such components all being dissolved in about 62 parts of water and such composition being free from methanol and free from phenolic bodies.

JOHN S. WILLIAMS.

REFERENCES CITED

The following references are of record in the file of this patent:

UNITED STATES PATENTS

| Number | Name | Date |
|---|---|---|
| 1,010,210 | Zimmer | Nov. 28, 1911 |
| 1,143,114 | Fuller | June 15, 1915 |
| 1,956,515 | Hall | Apr. 24, 1934 |
| 1,999,630 | Friesenhahn | Apr. 30, 1935 |
| 2,078,943 | Hall | May 4, 1937 |
| 2,091,935 | Remy et al. | Aug. 31, 1937 |
| 2,215,154 | Jones | Sept. 17, 1940 |
| 2,318,319 | McDonald | May 4, 1943 |

FOREIGN PATENTS

| Number | Country | Date |
|---|---|---|
| 199,759 | Great Britain | June 22, 1923 |
| 510,519 | Great Britain | July 31, 1939 |